US011268204B2

(12) United States Patent
Li et al.

(10) Patent No.: US 11,268,204 B2
(45) Date of Patent: Mar. 8, 2022

(54) METALLIC TERMINAL AND MANUFACTURING METHOD THEREOF

(71) Applicant: DONGGUAN LEADER PRECISION INDUSTRY CO., LTD, Dongguan (CN)

(72) Inventors: Guo-Dong Li, Dongguan (CN); Li-Jun Xu, Dongguan (CN); Xiao-Qing Zhang, Dongguan (CN); Knight Zhang, Dongguan (CN)

(73) Assignee: DONGGUAN LEADER PRECISION INDUSTRY CO., LTD., Dongguan (CN)

( * ) Notice: Subject to any disclaimer, the term of this patent is extended or adjusted under 35 U.S.C. 154(b) by 0 days.

(21) Appl. No.: 16/937,289

(22) Filed: Jul. 23, 2020

(65) Prior Publication Data

US 2020/0354849 A1 Nov. 12, 2020

(30) Foreign Application Priority Data

Mar. 24, 2020 (CN) .......................... 202010213066.4

(51) Int. Cl.
*C25D 7/00* (2006.01)
*C25D 3/12* (2006.01)
(Continued)

(52) U.S. Cl.
CPC .............. *C25D 7/003* (2013.01); *B32B 3/263* (2013.01); *C25D 3/12* (2013.01); *C25D 3/46* (2013.01);
(Continued)

(58) Field of Classification Search
CPC .. B32B 3/263; C25D 5/10; C25D 5/12; C25D 5/14; C25D 7/003; H01R 13/02; H01R 13/03; H01R 13/05
(Continued)

(56) References Cited

U.S. PATENT DOCUMENTS 4,662,702 A * 5/1987 Furuya ................... H01R 13/03
439/630
4,925,394 A * 5/1990 Hayashi ................. H01H 1/021
439/86

(Continued)

FOREIGN PATENT DOCUMENTS

CN       1591989 A       3/2005
CN       102088146 A      6/2011
(Continued)

*Primary Examiner* — Marcus E Harcum
(74) *Attorney, Agent, or Firm* — Birch, Stewart, Kolasch & Birch, LLP

(57) ABSTRACT

A metallic terminal includes a terminal body, a first plating layer, a second plating layer, and a third plating layer. The first plating layer is on the terminal body, and the thickness of the first plating layer at the bent portion of the terminal body is 0.3 to 1.75 micrometers, and the thickness of rest portions of the first plating layer is 2 to 10 micrometers. The second plating layer is on the first plating layer and corresponds to the contact portion of the terminal body, and the thickness of the second plating layer is 0.5 to 2 micrometers. The third plating layer is on the first plating layer and corresponds to the soldering portion of the terminal body, and the thickness of the third plating layer is 0.01 to 0.1 micrometers. A manufacturing method of metallic terminal is also provided.

10 Claims, 3 Drawing Sheets

(51) Int. Cl.
- *C25D 3/46* (2006.01)
- *C25D 3/48* (2006.01)
- *C25D 5/12* (2006.01)
- *C25D 5/34* (2006.01)
- *B32B 3/26* (2006.01)
- *C25D 5/02* (2006.01)
- *C25D 5/16* (2006.01)
- *H01R 13/03* (2006.01)
- *H01R 13/02* (2006.01)

(52) U.S. Cl.
CPC ............... *C25D 3/48* (2013.01); *C25D 5/02* (2013.01); *C25D 5/022* (2013.01); *C25D 5/12* (2013.01); *C25D 5/16* (2013.01); *C25D 5/34* (2013.01); *H01R 13/02* (2013.01); *H01R 13/03* (2013.01)

(58) Field of Classification Search
USPC .................................................. 439/886, 931
See application file for complete search history.

(56) References Cited

U.S. PATENT DOCUMENTS

| | | | | |
|---|---|---|---|---|
| 5,028,492 A * | 7/1991 | Guenin | ............ | H01B 1/22 428/614 |
| 5,083,928 A * | 1/1992 | Aikens | ............ | H01R 12/58 439/751 |
| 5,097,100 A * | 3/1992 | Jackson | ............ | H01R 4/029 174/126.2 |
| 5,230,632 A * | 7/1993 | Baumberger | ............ | H01R 13/03 439/591 |
| 5,237,743 A * | 8/1993 | Busacco | ............ | H01R 4/26 29/874 |
| 5,453,017 A * | 9/1995 | Belopolsky | ............ | H01R 4/028 439/83 |
| 5,780,172 A * | 7/1998 | Fister | ............ | B32B 15/01 428/647 |
| 6,669,489 B1 * | 12/2003 | Dozier, II | ............ | G01R 1/07378 439/71 |
| 6,860,746 B2 * | 3/2005 | Ota | ............ | H01R 13/03 439/181 |
| 7,032,307 B2 * | 4/2006 | Matsunaga | ............ | G01R 1/06761 29/825 |
| 8,002,595 B2 * | 8/2011 | Kobayashi | ............ | C10M 169/044 439/886 |
| 8,637,165 B2 * | 1/2014 | Siahaan | ............ | H01R 13/03 428/675 |
| 9,004,960 B2 * | 4/2015 | Weber | ............ | H01R 13/03 439/887 |
| 9,331,412 B2 * | 5/2016 | Moser | ............ | H01R 13/03 |
| 9,627,790 B2 * | 4/2017 | Anderson | ............ | H01R 13/115 |
| 10,256,588 B2 * | 4/2019 | Oda | ............ | G01R 1/067 |
| 10,691,276 B2 * | 6/2020 | Kuwabara | ............ | C25D 1/04 |
| 11,131,690 B2 * | 9/2021 | Crippa | ............ | H01R 13/03 |
| 2005/0048851 A1 * | 3/2005 | Okita | ............ | H01R 13/03 439/851 |
| 2010/0255735 A1 * | 10/2010 | Moriuchi | ............ | C25D 7/00 439/886 |
| 2010/0311288 A1 * | 12/2010 | Horn | ............ | C25D 5/617 439/886 |
| 2011/0009015 A1 * | 1/2011 | Yoshida | ............ | H01R 13/03 439/886 |
| 2013/0084760 A1 * | 4/2013 | Siahaan | ............ | H01R 13/03 439/887 |
| 2015/0333415 A1 * | 11/2015 | Takahashi | ............ | H01R 43/00 174/74 R |
| 2016/0308295 A1 * | 10/2016 | Dubniczki | ............ | H01R 12/712 |
| 2018/0233310 A1 * | 8/2018 | Tanaka | ............ | H01H 37/5427 |
| 2019/0064215 A1 * | 2/2019 | Park | ............ | H01R 13/03 |

FOREIGN PATENT DOCUMENTS

| | | |
|---|---|---|
| CN | 102239280 A | 11/2011 |
| CN | 102703941 B | 4/2015 |
| CN | 108390176 A | 8/2018 |
| TW | M585435 U | 10/2019 |

* cited by examiner

US 11,268,204 B2

METALLIC TERMINAL AND MANUFACTURING METHOD THEREOF

CROSS-REFERENCE TO RELATED APPLICATION

This non-provisional application claims priority under 35 U.S.C. § 119(a) to Patent Application No. 202010213066.4 filed in China, P.R.C. on Mar. 24, 2020, the entire contents of which are hereby incorporated by reference.

BACKGROUND

Technical Field

This disclosure relates to an electrical terminal, in particular, to a metallic terminal and a manufacturing method thereof.

Related Art

In general, to meet specifications for different connectors, a metallic terminal known to the inventor is bent through the stamping procedure, and then the metallic terminal is plated, using the principle of the Galvanic effect, to prevent the oxidation or corrosion of the metallic terminal upon the metallic terminal contacts the outside environment.

SUMMARY

However, as it is observed for a long time, due to the stress applied to the bent portion of the terminal, the plating layer at the bent portion may have cracks, damages, or may even have peelings. As a result, the oxidation and corrosion at the bent portion may be severe and worsen due to partially peeling on the terminal, thereby greatly affecting the conductive properties of the terminal. In general, in the case that the plating layer exceeds 2 micrometers, cracks and damages or even peelings of the plating layer can be observed at the bent portion.

In view of this, a metallic terminal is provided. One embodiment of the metallic terminal comprises a terminal body, a first plating layer, a second plating layer, and a third plating layer. The terminal body has a contact portion, a bent portion, and a soldering portion. Two ends of the bent portion are connected to the contact portion and the soldering portion, respectively. The first plating portion is on the terminal body. A thickness of the first plating layer at the bent portion is in a range between 0.3 micrometers and 1.75 micrometers, and a thickness of rest portions of the first plating layer is in a range between 2 micrometers and 10 micrometers. The second plating layer is on a first portion of the first plating layer and corresponds to the contact portion. A thickness of the second plating layer is in a range between 0.5 micrometers and 2 micrometers. The third plating layer is on a second portion of the first plating layer and corresponds to the soldering portion. A thickness of the third plating layer is in a range between 0.01 micrometers and 0.1 micrometers.

In one or some embodiments of the metallic terminal, the thickness of the first plating layer at the bent portion is in a range between 0.5 micrometers and 1.25 micrometers, and the thickness of the rest portions of the first plating layer is in a range between 2 micrometers and 6 micrometers.

In one or some embodiments of the metallic terminal, the thickness of the second plating layer is in a range between 0.75 micrometers and 1.5 micrometers, and the thickness of the third plating layer is in a range between 0.025 micrometers and 0.075 micrometers.

In one or some embodiments of the metallic terminal, the first plating layer is a Ni-plated layer or a Ni—W plated layer. More specifically, the second plating layer and the third plating layer each is an Au-plated layer or an Ag-plated layer.

Moreover, a manufacturing method of metallic terminal is further provided. In one embodiment, the manufacturing method comprises a terminal providing step, an oil removing step, an pickling step, a first electroplating step, a second electroplating step, a third electroplating step, and a hole sealing step.

In the terminal providing step, a terminal body is provided. The terminal body has a contact portion, a bent portion, and a soldering portion. Two ends of the bent portion are connected to the contact portion and the soldering portion, respectively. In the oil removing step, an oil on a surface of the terminal body is removed. In the pickling step, oxides on the surface of the terminal body are removed. In the first electroplating step, the terminal body is disposed in a first electroplating tank, a shielding fixture is disposed adjacent to the bent portion, and the terminal body is electroplated to form a first plating layer on the terminal body. A thickness of the first plating layer at the bent portion is in a range between 0.3 micrometers and 1.75 micrometers, and a thickness of rest portions of the first plating layer is in a range between 2 micrometers and 10 micrometers. In the second electroplating step, the contact portion of the terminal body is disposed in a second electroplating tank and electroplated to form a second plating layer on a first portion of the first plating layer. A thickness of the second plating layer is in a range between 0.5 micrometers and 2 micrometers. In the third electroplating step, the soldering portion of the terminal body is disposed in the second electroplating tank and electroplated to form a third plating layer on a second portion of the first plating layer. A thickness of the third plating layer is in a range between 0.01 micrometers and 0.1 micrometers. In the hole sealing step, a hole-sealing agent is applied on the surface of the terminal body after the first electroplating step, the second electroplating step, and the third electroplating step are executed.

In one or some embodiments of the manufacturing method of metallic terminal, the thickness of the first plating layer at the bent portion is in a range between 0.5 micrometers and 1.25 micrometers, and the thickness of the rest portions of the first plating layer is in a range between 2 micrometers and 6 micrometers.

In one or some embodiments of the manufacturing method of metallic terminal, the thickness of the second plating layer is in a range between 0.75 micrometers and 1.5 micrometers, and the thickness of the third plating layer is in a range between 0.025 micrometers and 0.075 micrometers.

In one or some embodiments of the manufacturing method of metallic terminal, the first plating layer is a Ni-plated layer or a Ni—W plated layer. More specifically, the second plating layer and the third plating layer each is an Au-plated layer or an Ag-plated layer.

Based on one or some embodiments of the instant disclosure, by decreasing the thickness of the first plating layer at the bent portion, the first plating layer can be prevented from peeling off the terminal to cause oxidation and corrosion at the bent portion. Therefore, electrical stability of the metallic terminal can be maintained.

BRIEF DESCRIPTION OF THE DRAWINGS

The disclosure will become more fully understood from the detailed description given herein below for illustration only, and thus not limitative of the disclosure, wherein.

DETAILED DESCRIPTION

It is understood that, when an element is referred to as being "connected to" or "disposed on" another element, it may indicate that the element is directly connected to or disposed on the another element, or it may indicate that an intermediate element exists, and the element is connected to or disposed on the another element through the intermediate element. In contrast, when an element is referred as being "directly (disposed) on" or "directly connected to" another element, it is realized that, the intermediate element is expressed excluded from the meaning of the foregoing descriptions.

Moreover, it should be understood that terms such as "first", "second", and "third" in this specification are used for distinguish one element, component, area, or part from another element, component, area, or part, but not used for indicating the definite orders of the elements, components, areas, or parts. Furthermore, terms such as "on" and "above" as well as "below" and "bottom" are used for describing a relative relationship between one element and another element. It should be understood that, such relative terms are intended to encompass different orientations of the device in addition to the orientation depicted in the figures. For example, if the device in the figures is turned over, an element described as being "below" another element will then be "above" the other element. The terms are provided for describing relative orientational relationships, rather than absolute orientational relationships.

Figure 1:
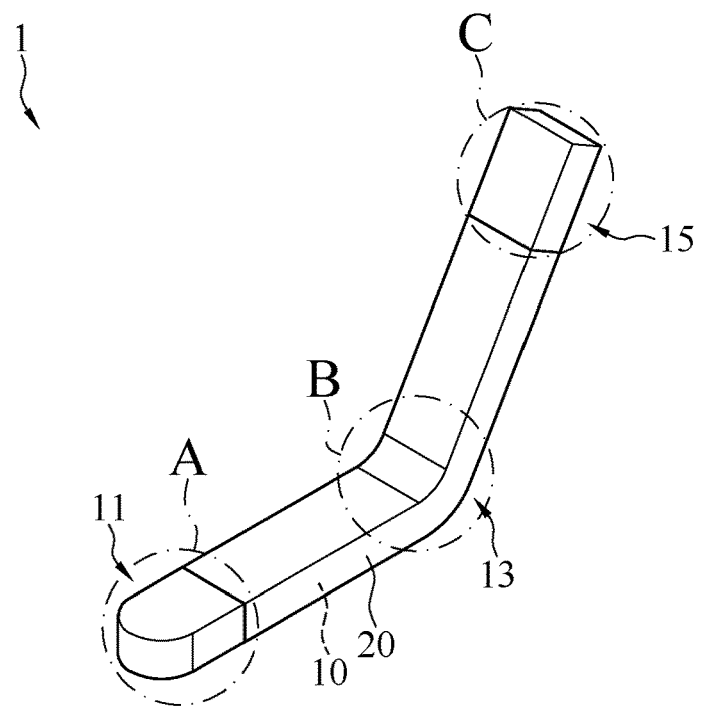
FIG. 1 illustrates a perspective view of a metallic terminal according to an exemplary embodiment of the instant disclosure.
Figure 2:
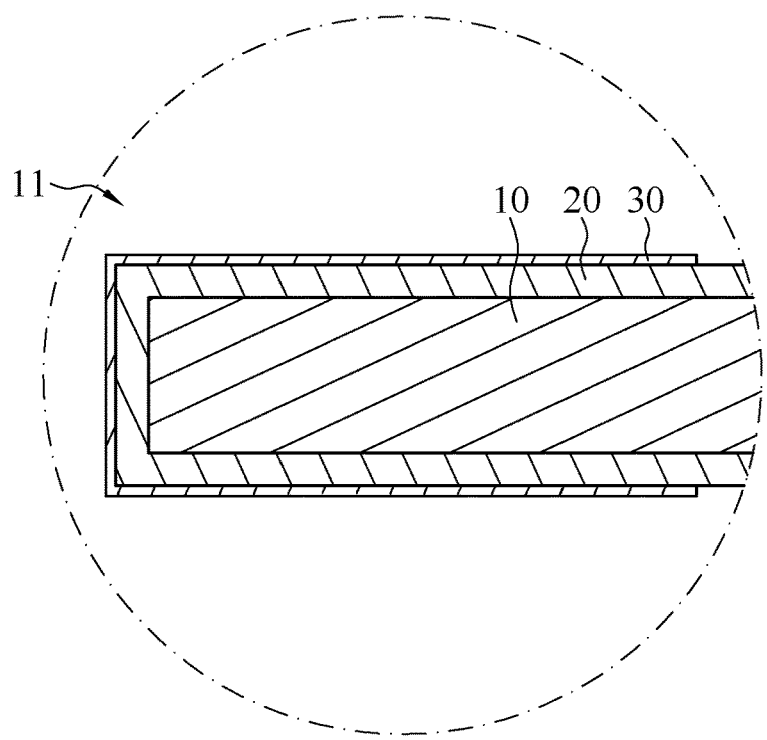
FIG. 2 illustrates an enlarged cross-sectional view of the portion A shown in FIG. 1.
Figure 3:
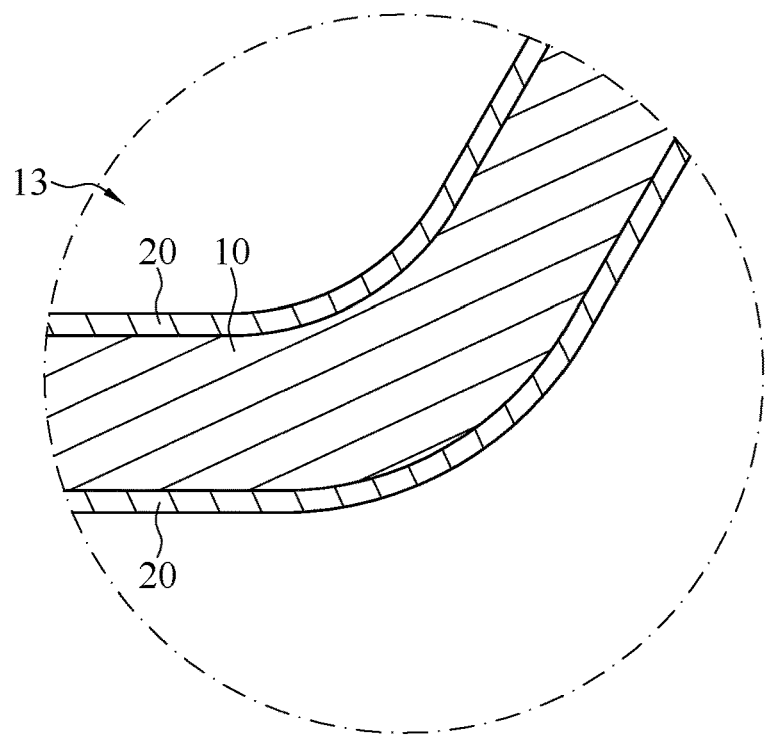
FIG. 3 illustrates an enlarged cross-sectional view of the portion B shown in FIG. 1.
Figure 4:
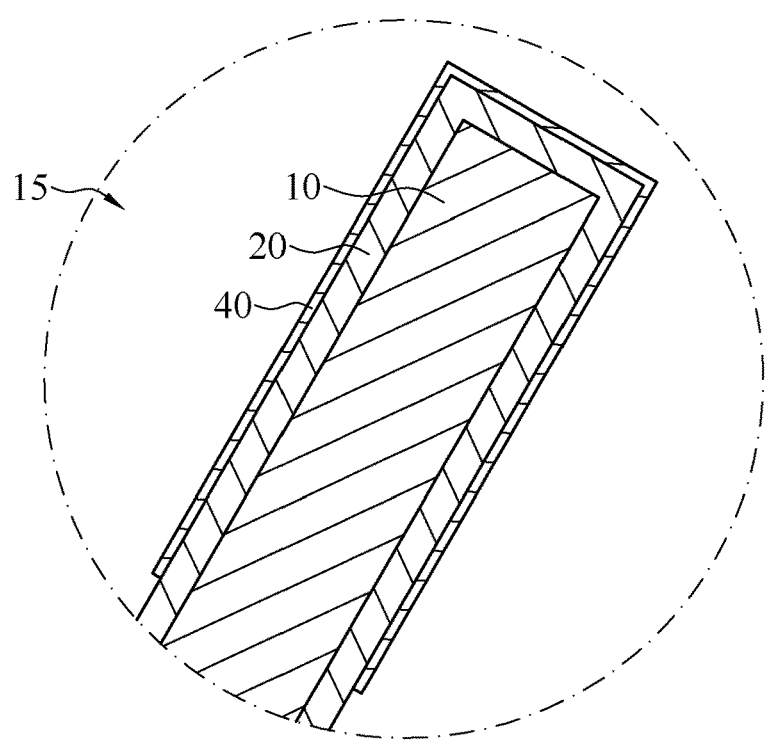
FIG. 4 illustrates an enlarged cross-sectional view of the portion C shown in FIG. 1.

FIG. 1 illustrates a perspective view of a metallic terminal according to an exemplary embodiment of the instant disclosure. FIG. 2 illustrates an enlarged cross-sectional view of the portion A shown in FIG. 1. FIG. 3 illustrates an enlarged cross-sectional view of the portion B shown in FIG. 1. FIG. 4 illustrates an enlarged cross-sectional view of the portion C shown in FIG. 1. As shown in FIGS. 1 to 4, the metallic terminal 1 comprises a terminal body 10, a first plating layer 20, a second plating layer 30, and a third plating layer 40. As shown in FIG. 1, the terminal body 10 has a contact portion 11, a bent portion 13, and a soldering portion 15. Two ends of the bent portion 13 are connected to the contact portion 11 and the soldering portion 15, respectively.

The first plating layer 20 is on the terminal body 10. As shown in FIG. 3, a thickness of the first plating layer 20 at the bent portion 13 is in a range between 0.3 micrometers and 1.75 micrometers. Moreover, as shown in FIGS. 2 and 4, a thickness of rest portions of the first plating layer 20 is in a range between 2 micrometers and 10 micrometers. More specifically, in one embodiment, the thickness of the first plating layer 20 at the bent portion 13 may be, preferably, in a range between 0.5 micrometers and 1.25 micrometers, and the thickness of the rest portions of the first plating layer 20 may be, preferably, in a range between 2 micrometers and 6 micrometers.

In this embodiment, the terminal body 10 may be formed by stamping a metallic sheet. It is understood that, the formation and the shape of the terminal body 10 as descried and illustrated are provided as illustrative examples, embodiments are not limited thereto. In practice, the terminal body 10 may have other portions between the contact portion 11 and the bent portion 13 and/or between the bent portion 13 and the soldering portion 15. Moreover, the terminal body 10 may include more than one bent portions 13. The material of the terminal body 10 may be copper, aluminum, or other highly conductive materials. The first plating layer 20 is a metallic plating layer whose oxidation potential is less than the oxidation potential of the terminal body 10, the first plating layer 20 has proper electrical conductivity, and the first plating layer 20 may be, but not limited to, a Ni-plated layer or a Ni—W plated layer.

As shown in FIG. 2, the second plating layer 30 is on a first portion of the first plating layer 20, and the second plating layer 30 corresponds to the contact portion 11 of the terminal body 10. A thickness of the second plating layer 30 is in a range between 0.5 micrometers and 2 micrometers. Preferably, in one embodiment, the thickness of the second plating layer 30 is in a range between 0.75 micrometers and 1.5 micrometers. As shown in FIG. 4, the third plating layer 40 is on a second portion of the first plating layer 20, and the third plating layer 40 corresponds to the soldering portion 15 of the terminal body 10. A thickness of the third plating layer 40 is in a range between 0.01 micrometers and 0.1 micrometers. Preferably, in one embodiment, the thickness of the third plating layer 40 is in a range between 0.025 micrometers and 0.075 micrometers. The second plating layer 30 and the third plating layer 40 are metallic plating layers whose oxidation potentials are less than the oxidation potential of the terminal body 10 and the oxidation potential of the first plating layer 20. The second plating layer 30 and the third plating layer 40 have proper electrical conductivity, and the second plating layer 30 and the third plating layer 40, may be, but not limited to, an Au-plated layer or an Ag-plated layer. It is understood that, in some embodiments, in order to meet the RoHS (Restriction of Hazardous Substances) regulations, the first plating layer 20, the second plating layer 30 and the third plating layer 40 exclude lead (Pb), cadmium (Cd), mercury (Hg), hexavalent chromium ($Cr^{6+}$), plybrominated diphenyl ethers (PBDEs), and polybrominated biphenyls (PBB).

Table 1 below shows the observation results of the bent portions with different electroplating times, where the plated thicknesses of the bent portions are measured through X-ray thickness analyzer and the bent portions are further observed with naked eyes and optical microscopes. In the table, the term "slightly damaged" indicates that, with naked-eyed observation, the surface of the plating layer is not damaged but cracks can be observed at the edge of the plating layer; alternatively, the term "slightly damaged" also indicates that, apparent cracks can be observed with the optical microscope. In the "slightly damaged" condition, the extension area of the cracks does not exceed 10% of the area of the bent portion. The term "seriously damaged" indicated that, with naked-eyed observation, cracks can be apparently observed from the surface of the plating layer.

TABLE 1

| | The thickness of the first plating layer at the bent portion | Testing results |
|---|---|---|
| Comparative example 1 | 1.6 micrometers | Slightly damaged |
| Comparative example 2 | 2.0 micrometers | Seriously damaged |
| Comparative example 3 | 2.4 micrometers | Seriously damaged |
| Comparative example 4 | 3.0 micrometers | Seriously damaged |
| Example 1 | 0.6 micrometers | Not damaged |
| Example 2 | 1.2 micrometers | Not damaged |

As seen from Table 1, the thickness of the first plating layer 20 at the bent portion 13 gives the criticality regarding damages or peelings of the first plating layer 20 at the bent portion 13. The criticality of the thickness of the first plating layer 20 at the bent portion 13 is apparent in the Examples 1 and 2. Furthermore, with the experiment results of the comparative example 1 and related calculations, it is estimated that, when the thickness of the first plating layer 20 at the bent portion 13 is decreased to a value equal to or less than 1.75 micrometers, the first plating layer 20 at the bent portion 13 can maintain the intended electrical conduction purpose. Moreover, with the considerations of possible oxidation or corrosions, the thickness of the first plating layer 20 at the bent portion 13 is not recommended to be too thin, and in general, the thickness of the first plating layer 20 at the bent portion 13 may be equal to or great than 0.3 micrometers.

Figure 5:
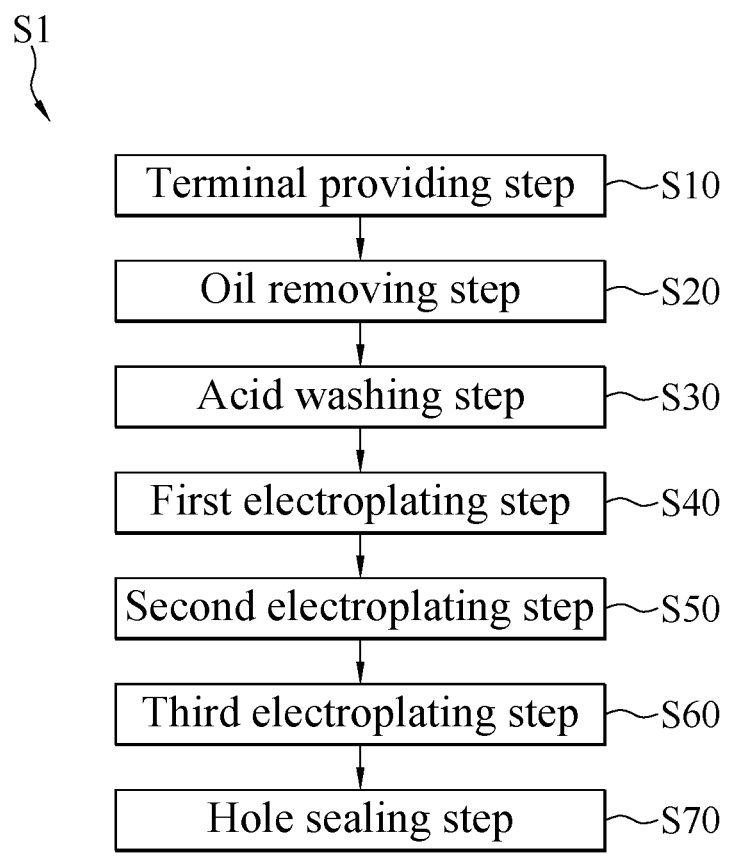
FIG. 5 illustrates a flowchart of a manufacturing method of metallic terminal according to an exemplary embodiment of the instant disclosure.

FIG. 5 illustrates a flowchart of a manufacturing method of metallic terminal according to an exemplary embodiment of the instant disclosure. As shown in FIG. 5, the manufacturing method of metallic terminal Si comprises a terminal providing step S10, an oil removing step S20, an pickling step S30, a first electroplating step S40, a second electroplating step S50, a third electroplating step S60, and a hole sealing step S70.

Please refer to FIGS. 1 and 4. In the terminal providing step S10, a terminal body is provided. The terminal body 10 has a contact portion 11, a bent portion 13, and a soldering portion 15, and two ends of the bent portion 13 are connected to the contact portion 11 and the soldering portion 15, respectively. In this embodiment, the terminal body 10 may be formed by stamping a metallic sheet. It is understood that, the formation and the shape of the terminal body 10 as descried and illustrated are provided as illustrative examples, embodiments are not limited thereto.

In the oil removing step S20, oils and dusts on the surface of the terminal body 10 are moved. In this embodiment, in the oil removing step S20, basic liquids or solutions or oil-removing powders are used to remove the lubricants, oils, dusts, or particles attached on the terminal body 10. In the embodiment of the instant disclosure, the terminal body 10 is placed in a solvent having a temperature between 50 Celsius degrees and 65 Celsius degrees and using copper powder as the oil-removing agent. The Baume degree of the solvent is in a range between 10 Be and 20 Be, and electricity having a voltage of 2 Volts is applied to the solvent by 5 seconds to 10 seconds. However, it is understood that, the oil removing step S20 is not limited to be executed according to the foregoing descriptions, other oil removing methods may be provided as the oil removing step S20.

In the pickling step S30, the oxides on the surface of the terminal body 10 are removed. In this embodiment, the terminal body 10 undergone the oil removing step S20 is placed in an acid-washing tank for immersion. A strong acids such as sulfuric acid, hydrochloric acid, or the like is contained in the pickling tank, for removing the oxides on the surface of the terminal body 10 as well as removing uncleaned oils or particles on the surface of the terminal body 10. Moreover, because acid corrosion is applied to the surface of the terminal body 10, the plating layers can be attached on the surface of the terminal body 10 easily upon subsequent plating steps are executed. The pickling parameters in this embodiment are that, the acid is sulfuric acid, the Baume degree of the acid is in a range between 8 Be and 15 Be, the temperature of the acid is in a range between 20 Celsius degrees and 30 Celsius degrees, and the immersion time for the pickling step S30 is 5 seconds to 10 seconds. However, it is understood that, the pickling step S30 is not limited to be executed according to the foregoing descriptions, the actual pickling parameters can be adjusted according to the condition of the terminal body 10.

In the first electroplating step S40, the terminal body 10 is placed in a first electroplating tank, a shielding fixture is disposed adjacent to the bent portion 13, and the terminal body 10 is electroplated. In this embodiment, the shielding fixture may be disposed above the bent portion 13 or may be disposed at two sides of the bent portion 13, rather than completely shielding the bent portion 13. Accordingly, by reducing the current flux applied to the terminal body 10, the thickness of the first plating layer 20 at the bent portion 13 can be reduced. After the first electroplating step S40 is executed, the thickness of the first plating layer 20 at the bent portion 13 is in a range between 0.3 micrometers and 1.75 micrometers, and a thickness of rest portions of the first plating layer 20 is in a range between 2 micrometers and 10 micrometers. Preferably, in one embodiment, the thickness of the first plating layer 20 at the bent portion 13 is in a range between 0.5 micrometers and 1.25 micrometers, and the thickness of the rest portions of the first plating layer 20 is in a range between 2 micrometers and 6 micrometers. By using the shielding fixture to block parts of the current applied on the terminal body 10, electroplating layers with different thicknesses can be provided by a one-time electroplating procedure.

The first plating layer 20 may be a Ni-plated layer or a Ni—W plated layer. In an embodiment, the first plating layer 20 is a Ni-plated layer, and in the electroplating procedure, nickel electroplating solution is provided in the first electroplating tank, the concentration of the nickel ion is in a range between 1 g/L and 3 g/L, the concentration of nickel chloride ($NiCl_2$) is between 5 g/L and 15 g/L, and boric acid having a concentration between 33 g/L and 55 g/L is added in the nickel electroplating solution. The Baume degree of the electroplating solution is in a range between 25 Be and 35 Be, the pH value of the electroplating solution is in a range between 3.8 and 4.4, and the temperature of the electroplating solution is in a range between 50 Celsius degrees and 65 Celsius degrees. In this embodiment, shielding fixture is placed on two sides of the bent portion 13, and then electricity having a voltage of 2 Volts is applied to the electroplating solution, and the electroplating procedure is controlled to be executed by 5 seconds to 10 seconds.

However, it is understood that, the first electroplating step S40 is not limited to be executed according to the foregoing descriptions.

In the second electroplating step S50, the contact portion 11 of the terminal body 10 is disposed in a second electroplating tank and electroplated, so that a second plating layer 30 is formed on a first portion of the first plating layer 20. The thickness of the second plating layer 30 is in a range between 0.5 micrometers and 2 micrometers. Preferably, in one embodiment, the thickness of the second plating layer 30 is in a range between 0.75 micrometers and 1.5 micrometers. In the third electroplating step S60, the soldering portion 15 of the terminal body 10 is disposed in the second electroplating tank and electroplated, so that a third plating layer 40 is formed on a second portion of the first plating layer 20, and the third plating layer 40 corresponds to the soldering portion 15 of the terminal body 10. The thickness of the third plating layer 40 is in a range between 0.01 micrometers and 0.1 micrometers. Preferably, in one embodiment, the thickness of the third plating layer 40 is in a range between 0.025 micrometers and 0.075 micrometers.

The second plating layer 30 and the third plating layer 40 each may be an Au-plated layer or an Ag-plated layer. The second plating layer 30 is used for preventing the wearing and corrosion of the contact portion 11. Moreover, the second plating layer 30 further provides an effect of stabilizing electrical properties. The third plating layer 40 is not only used for preventing the wearing and corrosion of the soldering portion 15, but also allows the soldering portion 15 to be properly bonded to the solder. In an embodiment, the second plating layer 30 (and the third plating layer 40) is an Au-plated layer, and in the electroplating procedure, gold electroplating solution is provided in the second electroplating tank, the concentration of the gold ion is in a range between 3 g/L and 6 g/L, the concentration of the conductive salt is between 80 g/L and 120 g/L, the concentration of the balanced salt is between 80 g/L and 120 g/L, and the concentration of the anti-replacement agent is between 1 and 1.5 mg/L. The Baume degree of the electroplating solution is in a range between 8 Be and 15 Be, the pH value of the electroplating solution is in a range between 3.8 and 4.8, and the temperature of the electroplating solution is in a range between 50 Celsius degrees and 60 Celsius degrees. Electricity having a current of 1 Amp is applied to the electroplating solution, and the electroplating procedure is controlled to be executed by 3 seconds to 10 seconds. However, it is understood that, the second electroplating step S50 (and the third electroplating step S60) is not limited to be executed according to the foregoing descriptions.

In the hole sealing step S70, a hole-sealing agent is applied on the surface of the terminal body 10 after the first electroplating step S40, the second electroplating step S50, and the third electroplating step S60 are executed. In this embodiment, the hole-sealing agent may be a water-based hole-sealing agent, and the application of the hole-sealing agent may be immersion, spraying, roll-plating, or the like. Hence, Pores that are possibly formed in the first plating layer 20, the second plating layer 30, and the third plating layer 40 may be sealed by the hole-sealing agent. In the hole sealing step S70 according to this embodiment, the water solubility of the water-based hole-sealing agent is in a range between 2% and 5%, the temperature is in a range between 40 Celsius degrees and 60 Celsius degrees, and the hole-sealing agent is applied on the terminal body 10 by immersion. However, it is understood that, the hole sealing step S70 is not limited to be executed according to the foregoing descriptions.

Based on one or some embodiments of the instant disclosure, by decreasing the thickness of the first plating layer 20 on the bent portion 13, the first plating layer 20 can be prevented from peeling off the terminal to cause oxidation and corrosion at the bent portion 13. Therefore, the metallic terminal 1 can provide proper conductive properties.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A metallic terminal, comprising:
    a terminal body having a contact portion, a bent portion, and a soldering portion, wherein two ends of the bent portion are connected to the contact portion and the soldering portion, respectively;
    a first plating layer on the terminal body, wherein a thickness of the first plating layer at the bent portion is in a range between 0.3 micrometers and 1.75 micrometers, and a thickness of rest portions of the first plating layer is in a range between 2 micrometers and 10 micrometers;
    a second plating layer on a first portion of the first plating layer and corresponding to the contact portion, wherein a thickness of the second plating layer is in a range between 0.5 micrometers and 2 micrometers; and
    a third plating layer on a second portion of the first plating layer and corresponding to the soldering portion, wherein a thickness of the third plating layer is in a range between 0.01 micrometers and 0.1 micrometers.

2. The metallic terminal according to claim 1, wherein the thickness of the first plating layer at the bent portion is in a range between 0.5 micrometers and 1.25 micrometers, and the thickness of the rest portions of the first plating layer is in a range between 2 micrometers and 6 micrometers.

3. The metallic terminal according to claim 1, wherein the thickness of the second plating layer is in a range between 0.75 micrometers and 1.5 micrometers, and the thickness of the third plating layer is in a range between 0.025 micrometers and 0.075 micrometers.

4. The metallic terminal according to claim 1, wherein the first plating layer is a Ni-plated layer or a Ni—W plated layer.

5. The metallic terminal according to claim 4, wherein the second plating layer and the third plating layer each is an Au-plated layer or an Ag-plated layer.

6. A method of manufacturing the metallic terminal of claim 1, comprising:
    a terminal providing step: providing the terminal body, wherein the terminal body has the contact portion, the bent portion, and the soldering portion, and wherein the two ends of the bent portion are connected to the contact portion and the soldering portion, respectively;
    an oil removing step for removing an oil on a surface of terminal body;
    a pickling step for removing oxides on the surface of the terminal body;
    a first electroplating step: disposing the terminal body in a first electroplating tank, disposing a shielding fixture adjacent to the bent portion, and electroplating the terminal body to form the first plating layer on the terminal body, wherein the thickness of the first plating layer at the bent portion is in a range between 0.3 micrometers and 1.75 micrometers, and the thickness of rest portions of the first plating layer is in a range between 2 micrometers and 10 micrometers;

a second electroplating step: disposing the contact portion of the terminal body in a second electroplating tank and electroplating the contact portion of the terminal body to form the second plating layer on the first portion of the first plating layer, wherein the thickness of the second plating layer is in a range between 0.5 micrometers and 2 micrometers;

a third electroplating step: disposing the soldering portion of the terminal body in the second electroplating tank and electroplating the soldering portion of the terminal body to form the third plating layer on the second portion of the first plating layer, wherein the thickness of the third plating layer is in a range between 0.01 micrometers and 0.1 micrometers; and a hole sealing step: applying a hole-sealing agent on the surface of the terminal body after the first electroplating step, the second electroplating step, and the third electroplating step are executed.

7. The method according to claim 6, wherein the thickness of the first plating layer at the bent portion is in a range between 0.5 micrometers and 1.25 micrometers, and the thickness of the rest portions of the first plating layer is in a range between 2 micrometers and 6 micrometers.

8. The method according to claim 6, wherein the thickness of the second plating layer is in a range between 0.75 micrometers and 1.5 micrometers, and the thickness of the third plating layer is in a range between 0.025 micrometers and 0.075 micrometers.

9. The method according to claim 6, wherein the first plating layer is a Ni-plated layer or a Ni—W plated layer.

10. The method according to claim 9, wherein the second plating layer and the third plating layer each is an Au-plated layer or an Ag-plated layer.

* * * * *